United States Patent
Bergmann et al.

(10) Patent No.: US 12,157,361 B2
(45) Date of Patent: Dec. 3, 2024

(54) STORAGE DEVICE FOR STORING ELECTRIC ENERGY FOR A MOTOR VEHICLE, MOTOR VEHICLE, AND METHOD FOR PRODUCING A STORAGE HOUSING FOR A STORAGE DEVICE

(71) Applicant: Bayerische Motoren Werke Aktiengesellschaft, Munich (DE)

(72) Inventors: Clemens Bergmann, Munich (DE); Jan Danneberg, Munich (DE); Marc Reinstettel, Munich (DE); Martin Schiebel, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 329 days.

(21) Appl. No.: 17/763,724

(22) PCT Filed: Oct. 22, 2020

(86) PCT No.: PCT/EP2020/079737
§ 371 (c)(1),
(2) Date: Mar. 25, 2022

(87) PCT Pub. No.: WO2021/083782
PCT Pub. Date: May 6, 2021

(65) Prior Publication Data
US 2022/0371422 A1   Nov. 24, 2022

(30) Foreign Application Priority Data
Oct. 28, 2019   (DE) .................... 10 2019 129 045.7

(51) Int. Cl.
*B60K 1/04* (2019.01)
*H01M 50/20* (2021.01)

(52) U.S. Cl.
CPC .............. *B60K 1/04* (2013.01); *H01M 50/20* (2021.01); *B60K 2001/0438* (2013.01); *H01M 2220/20* (2013.01)

(58) Field of Classification Search
CPC .............................................. B60K 2001/0438
See application file for complete search history.

(56) References Cited

U.S. PATENT DOCUMENTS 10,797,284 B2 * 10/2020 Herrmann ......... H01M 10/0486
11,133,553 B2 *  9/2021 Kim ..................... H01M 50/24
(Continued)

FOREIGN PATENT DOCUMENTS

CN   105144425 A   12/2015
CN   109565010 A    4/2019
(Continued)

OTHER PUBLICATIONS

English translation of Office Action issued in Chinese Application No. 202080068330.8 dated Dec. 30, 2023 (5 pages).
(Continued)

*Primary Examiner* — Jason D Shanske
*Assistant Examiner* — James J Triggs
(74) *Attorney, Agent, or Firm* — Crowell & Moring LLP (57) ABSTRACT

A storage device for storing electric energy for a motor vehicle includes a storage housing that has a receiving area in which multiple storage cells for storing electric energy are received, and at least one housing part which at least partly delimits the receiving area. The housing part is reinforced by way of at least one reinforcing element formed separately from the housing part in at least one subregion. The reinforcing element has multiple separate through openings arranged at a distance from one another.

13 Claims, 3 Drawing Sheets

(56) References Cited

U.S. PATENT DOCUMENTS

| | | |
|---|---|---|
| 2011/0162431 A1 | 7/2011 | Flehmig et al. |
| 2013/0161105 A1 | 6/2013 | Maguire et al. |
| 2014/0182966 A1 | 7/2014 | Fisk et al. |
| 2015/0009382 A1 | 1/2015 | Ito et al. |
| 2016/0006008 A1 | 1/2016 | Volz |
| 2016/0233468 A1 | 8/2016 | Nusier et al. |
| 2017/0025720 A1* | 1/2017 | Kaiser ................ H01M 10/425 |
| 2019/0148690 A1 | 5/2019 | Newman |
| 2019/0221797 A1 | 7/2019 | Nierfoff et al. |
| 2019/0337402 A1 | 11/2019 | Günther |
| 2020/0076028 A1 | 3/2020 | Darbandi et al. |
| 2021/0146766 A1 | 5/2021 | Haberl et al. |
| 2021/0170853 A1 | 6/2021 | Schmidt et al. |

FOREIGN PATENT DOCUMENTS

| | | |
|---|---|---|
| CN | 110313084 A | 10/2019 |
| DE | 195 24 235 A1 | 1/1997 |
| DE | 10 2007 038 713 A1 | 2/2009 |
| DE | 10 2009 043 635 A1 | 4/2011 |
| DE | 10 2012 223 062 A1 | 6/2013 |
| DE | 11 2012 001 388 T5 | 12/2013 |
| DE | 10 2016 213 832 A1 | 2/2018 |
| DE | 10 2017 104 360 A1 | 9/2018 |
| DE | 10 2017 005 329 A1 | 12/2018 |
| DE | 10 2017 005 401 A1 | 12/2018 |
| DE | 10 2017 211 372 A1 | 1/2019 |
| DE | 10 2018 202 413 A1 | 8/2019 |
| DE | 10 2018 206 100 A1 | 10/2019 |
| DE | 10 2018 120 268 A1 | 2/2020 |
| EP | 1 898 479 A1 | 3/2008 |
| EP | 2 332 761 A1 | 6/2011 |
| EP | 2 465 719 A1 | 6/2012 |
| EP | 2 468 609 A2 | 6/2012 |

OTHER PUBLICATIONS

English translation of Office Action issued in Chinese Application No. 202080068771.8 dated Dec. 22, 2023 (7 pages).

International Search Report (PCT/ISA/210) issued in PCT Application No. PCT/EP2020/079737 dated Dec. 21, 2020 with English translation (four (4) pages).

German-language Written Opinion (PCT/ISA/237) issued in PCT Application No. PCT/EP2020/079737 dated Dec. 21, 2020 (six (6) pages).

German-language Search Report issued in German Application No. 10 2019 129 045.7 dated Sep. 8, 2020 with partial English translation (12 pages).

International Search Report (PCT/ISA/210) issued in PCT Application No. PCT/EP2020/079432 dated Feb. 15, 2021 with English translation (four (4) pages).

German-language Written Opinion (PCT/ISA/237) issued in PCT Application No. PCT/EP2020/079432 dated Feb. 15, 2021 (five (5) pages).

German-language Search Report issued in German Application No. 10 2019 129 047.3 dated Aug. 21, 2020 with partial English translation (13 pages).

U.S. Appl. No. 17/763,721, filed Mar. 25, 2022.

* cited by examiner

STORAGE DEVICE FOR STORING ELECTRIC ENERGY FOR A MOTOR VEHICLE, MOTOR VEHICLE, AND METHOD FOR PRODUCING A STORAGE HOUSING FOR A STORAGE DEVICE

CROSS-REFERENCE TO RELATED APPLICATION

This application contains subject matter related to U.S. application Ser. No. 17/763,721, entitled "Modular System And Method For Producing Design Variants Of A Housing Element For An Electric Storage Device Of A Motor Vehicle" filed on even date herewith.

BACKGROUND AND SUMMARY

The invention relates to a storage device for storing electrical energy for a motor vehicle. The invention also relates to a motor vehicle, in particular a motor car, having at least one such storage device. Furthermore, the invention relates to a method for producing a storage housing for a storage device for a motor vehicle.

DE 11 2012 001 388 T5 discloses a panel assembly which has a main panel with an acoustically active region, and which has a primary adhesive layer and a multi-layer patch with at least two individual patches and at least one auxiliary adhesive layer. The primary adhesive layer fastens the multi-layer patch to the main panel in the acoustically active region for soundproofing.

EP 2 468 609 A2 discloses an energy-absorbing and distributing side impact system for a vehicle. The side impact system comprises a battery stack housing which is designed to hold a plurality of batteries. The battery stack housing is arranged between a first vehicle structure side element and a second vehicle structure side element.

It is the object of the present invention to provide a storage device for storing electrical energy for a motor vehicle, a motor vehicle, and a method for producing a storage housing for a storage device for storing electrical energy for a motor vehicle, in order to be able to realize particularly advantageous, in particular mechanical, properties of the storage housing.

This object is achieved according to the invention by a storage device, by a motor vehicle, and by a method, in accordance with the independent claims. Advantageous refinements of the invention are the subject matter of the dependent claims.

A first aspect of the invention relates to a storage device for storing electrical energy or electrical current for a motor vehicle, in particular for a motor car preferably in the form of a passenger motor car. The storage device has a storage housing which has or delimits a receiving space. A plurality of storage cells for storing the electrical energy are accommodated in the receiving space. In addition, the storage housing has at least one housing part which at least partially, in particular by half or at least predominantly, delimits the receiving space.

In a fully manufactured state of the motor vehicle, the storage device is used, for example, in order to supply an electric machine of the motor vehicle with electrical energy or electrical current stored by means of or in the storage device. In other words, in its fully manufactured state, the motor vehicle has the storage device and the electric machine, by means of which the motor vehicle can be driven, in particular purely, electrically. For the, in particular purely, electrical driving of the motor vehicle by means of the electric machine, the electric machine is supplied with electrical energy or electrical current, which electrical energy or electrical current is stored in the storage device. By this means, the electric machine can be operated in a motor mode and therefore as an electric motor, by means of which the motor vehicle can be driven, in particular purely, electrically. The electric machine is therefore also referred to as traction machine, and the storage device is therefore also referred to as a traction store.

In order to be able to realize particularly high electrical power for the, in particular purely, electrical driving of the motor vehicle, which is in the form, for example, of an electric vehicle or hybrid vehicle, the storage device has an electrical voltage, in particular an electrical operating or nominal voltage, which is preferably greater than 50 volts, in particular above 60 volts, and is preferably several hundred volts. In particular, the motor vehicle can be in the form of a battery electric vehicle (BEV). Since the storage device preferably has an electrical voltage, in particular operating or nominal voltage, which is greater than 50 volts, in particular greater than 60 volts, or is several 100 volts, the storage device is preferably a high-voltage component. In particular, the storage device can be in the form of a battery, in particular in the form of a high-voltage battery (HV battery).

In order now to be able to realize particularly advantageous, in particular mechanical, properties of the storage housing and therefore, for example, a particularly advantageous accident behavior of the storage housing, and therefore of the storage device as a whole, it is provided according to the invention that the housing part is reinforced in at least one partial region by at least one reinforcing element which is formed separately from the housing part and which intrinsically has, that is to say as viewed by itself, a plurality of through openings which are separated from one another and are spaced apart from one another. When the reinforcing element is considered by itself, the through openings completely penetrate the reinforcing element, wherein, for example, the housing part, which is formed separately from the reinforcing element, can cover and therefore close the through openings. In particular, the feature that the through openings are spaced apart from one another can be understood as meaning that the through openings are separated from one another such that respective wall regions of the reinforcing element are arranged between the through openings. The wall regions are preferably formed as a single piece with one another, and/or the reinforcing element is formed intrinsically, or as viewed by itself, in one piece. The respective through opening is preferably closed in a completely encircling manner along its circumferential direction or delimited by the respective reinforcing element. The through openings are also referred to as through holes or holes and therefore form a pattern of perforations which can be formed axially symmetrically or else, in particular completely, asymmetrically with respect to at least or precisely one axis of symmetry. The reinforcing element is arranged, for example, in the partial region and is connected, in particular in an integrally bonded manner, to the partial region. The reinforcing element is also referred to as a perforated plate or patch plate, wherein the housing part can be reinforced particularly advantageously, appropriately and favorably in terms of construction space and weight by means of the reinforcing element. In particular, the reinforcing element makes it possible to be able to realize anisotropic properties of the partial region or of the housing part overall particularly appropriately and favorably in terms of cost, weight and construction space. In particular, such anisotropic properties can be appropriately set by corresponding selection or configuration of the pattern of perforations and can therefore be adapted, for example, to different load situations or loadings.

It is preferably provided that the housing part is reinforced, in particular merely, locally by means of the reinforcing element. This means that the partial region which is provided, for example, with the reinforcing element is adjoined by at least one further partial region of the housing part, wherein a further partial region is free from the reinforcing element and basically free from stiffening or reinforcing elements, which are formed in particular separately from the housing part.

The invention is based in particular on the findings that different requirements in respect of strength and therefore wall thicknesses can be made of different regions of the storage housing. In order, against this background, to be able to keep the weight, the requirement for construction space and the costs of the storage housing particularly low, and at the same time to be able to realize particularly advantageous, in particular mechanical, properties of the storage housing, the housing part and therefore the storage housing are provided with the reinforcing element or with respective reinforcing elements at least in the partial region or else in a plurality of partial regions which are spaced apart from one another. In particular, the feature that the partial regions are spaced apart from one another can be understood as meaning that there is at least one further partial region of the housing part between the partial regions, the further partial region of said housing part being free from stiffening and reinforcing elements, formed in particular separately from the housing part. By means of the appropriate reinforcement of the housing part, it is possible in particular to realize the housing part with only a small number of parts or in particular to configure the housing part in one piece, and therefore, for example, sealing circumferences for sealing the receiving space can be kept particularly small. In particular, it is contemplated that the housing part, which is also referred to as basic part, has at least or precisely two structural elements which are formed separately from one another and are connected to one another and which form the housing part as a whole.

In order to be able to particularly advantageously reinforce or stiffen the partial region and therefore the housing part, it is provided, in one embodiment of the invention, that the reinforcing element overlaps the partial region, in particular flatly.

It has been shown to be furthermore particularly advantageous if the reinforcing element is adhesively bonded to the partial region, in particular flatly, as a result of which the reinforcing element is connected to the partial region in an integrally bonded manner. In other words, the reinforcing element is adhesively bonded, in particular flatly, to the partial region by means of an adhesive, which is also referred to as glue, such that the adhesive is arranged, in particular flatly, between the reinforcing element and the partial region. By this means, the adhesive forms, for example, an adhesive layer which can particularly advantageously absorb or transmit shearing stresses. As a result, effective and efficient reinforcement or stiffening of the housing part can be provided.

It has been shown to be furthermore particularly advantageous if the reinforcing element is welded to the housing part, in particular to the partial region. In particular, it is conceivable that the reinforcing element is welded to the housing part, in particular to the partial region, by spot welding. An advantageous connection of the reinforcing element to the housing part can thereby be realized, and therefore advantageous reinforcement of the housing part can be provided.

In order to be able to realize particularly advantageous mechanical properties of the housing part and therefore of the storage housing as a whole, it is provided, in a further refinement of the invention, that the reinforcing element and/or the housing part is/are formed from a metallic material, in particular from steel.

The particularly appropriate reinforcement of the housing part by means of the reinforcing element makes it possible to realize a particularly advantageous accident behavior of the housing part and therefore of the storage housing as a whole. This should be understood as meaning in particular that, for example, a deformation of the storage housing resulting from an accident-induced action of force can be avoided or at least kept particularly small, in particular, for example, in the event of a side impact. As a result, the storage housing can particularly advantageously protect the storage cells which, in the fully manufactured state of the motor vehicle, are arranged in the receiving space and therefore in the storage housing.

It has been shown here to be particularly advantageous if, in the installed position of the storage device, the reinforcing element is arranged in an outer lateral and therefore, for example, left or right edge region of the housing part in the transverse direction of the vehicle. As a result, in particular, the edge region of the housing part can have an advantageously high degree or rigidity or strength in the edge region, and therefore the housing part can protect the storage cells particularly well, in particular in the event of a side impact.

Finally, it has been shown to be particularly advantageous for realizing particularly advantageous, in particular mechanical, properties of the storage housing, if the housing part is a floor element of a floor of a self-supporting body for the motor vehicle or of the motor vehicle. In other words, the motor vehicle is preferably designed as a motor car, in particular a passenger motor car, and, in its fully manufactured state, has a self-supporting body. The housing part here is part of the body, which is also referred to as body shell, wherein the housing part is a floor element, in particular a floor panel, of a floor, which is also referred to as the main floor, of the body. The floor element at least partially, in particular at least predominantly or entirely, delimits the interior of the motor car downward in the vertical direction of the vehicle. In particular, for example, the floor element, in particular an upper side of the floor element facing upward in the vertical direction of the vehicle in the installed position of the storage device, forms what is referred to as a foot well which faces the interior and at least partially delimits the interior downward in the vertical direction of the vehicle. It is provided here, for example, in the fully manufactured state of the motor vehicle, that the upper side is covered and is therefore lined with a lining element, in particular with a carpet. In the fully manufactured state of the motor vehicle, the storage device takes up its previously mentioned installed position.

Since it is preferably provided that the housing part is the abovementioned floor element of the body of the motor vehicle, the housing part is integrated in the body of the motor vehicle. A particularly high degree of strength or rigidity can thereby be realized. In addition, the number of parts and therefore the weight and the costs for arranging the storage device on the motor vehicle or on the body can be kept particularly low.

It has been shown to be particularly advantageous here if the partial region which is provided with the reinforcing element and is thereby reinforced or stiffened by means of the reinforcing element forms at least part, preferably at least half or a predominant part, of a side sill of the body. The reinforcement of the partial region by means of the reinforcing element makes it possible to realize a particularly high degree of strength or rigidity of the side sill such that the storage cells can be effectively and efficiently protected, in particular in the event of a side impact.

In order to be able to adequately seal the receiving space for at least one gas and/or at least one liquid, a particularly small number of parts of the storage housing is advantageous. It is therefore preferably provided that the housing part is intrinsically formed as a single piece or has at least or at most two components, which are formed separately from one another and are connected to one another, in the form of the previously mentioned structural elements. The receiving space can thereby be sealed particularly simply and cost-effectively, in particular for gases and/or liquids.

In order to be able to adhesively bond and therefore connect the reinforcing element particularly advantageously to the partial region, it is preferably provided that the previously mentioned adhesive is formed from a polymer and therefore forms a polymer layer in the form of the previously mentioned adhesive layer. By this means, particularly advantageous properties can be realized.

A second aspect of the invention relates to a motor vehicle which is preferably in the form of a motor car, in particular in the form of a passenger motor car, and which has at least one storage device according to the first aspect of the invention. Advantages and an advantageous refinement of the first aspect of the invention should be considered as advantages and advantageous refinements of the second aspect of the invention, and vice versa.

A third aspect of the invention relates to a method for producing a storage housing for a storage device, which has a plurality of storage cells, for storing electrical energy for a motor vehicle, wherein the storage housing has or delimits at least one receiving space for the storage cells. In particular, the storage housing of the storage device according to the first aspect of the invention is produced within the scope of the method according to the invention. In the method, at least one housing part of the storage housing is produced in such a manner, in particular formed in such a manner, that the housing part at least partially delimits the receiving space in which the storage cells, which are designed for storing the electrical energy, can be at least partially, in particular at least predominantly or completely, accommodated.

In order now to be able to realize particularly advantageous, in particular mechanical, properties of the storage housing and therefore of the storage device as a whole, it is provided, within the scope of the method according to the invention, that the housing part is provided in at least one partial region with at least one reinforcing element, which is formed separately from the housing part, and is reinforced as a result, wherein the reinforcing element intrinsically has, that is to say as viewed by itself, a plurality of through openings which are separated from one another and are spaced apart from one another. Advantages and advantageous refinements of the first and second aspect of the invention should be considered as advantages and advantageous refinements of the third aspect of the invention, and vice versa.

In order to be able to reinforce the housing part particularly advantageously by means of the reinforcing element, it is provided, in one embodiment of the invention, that the reinforcing element and the housing part are connected to each other, in particular are adhesively bonded to each other, and are then simultaneously or jointly formed, in particular deep drawn, by means of a forming tool. It can thereby be ensured, for example, that the reinforcing element, in particular with the aid of the previously mentioned adhesive layer, advantageously lies on the housing part or follows the housing part during molding of the housing part or of the partial region. Efficient and effective reinforcement or stiffening of the housing part can thereby be ensured.

The housing part can comprise at least one or more further partial regions which differ from the partial region reinforced by means of the reinforcing element and which are merely used, for example, to realize a sufficient tightness of the receiving space and otherwise do not take on any special stiffening functions. The respective further partial region can therefore be free from reinforcing or stiffening elements, formed separately from the housing part. In particular, it is possible to form the respective further partial region without any features.

Further details of the invention emerge from the description below of preferred exemplary embodiments with the associated drawings.

BRIEF DESCRIPTION OF THE DRAWINGS

In the figures, identical or functionally identical elements are provided with the same reference signs.

DETAILED DESCRIPTION OF THE DRAWINGS

Figure 1:
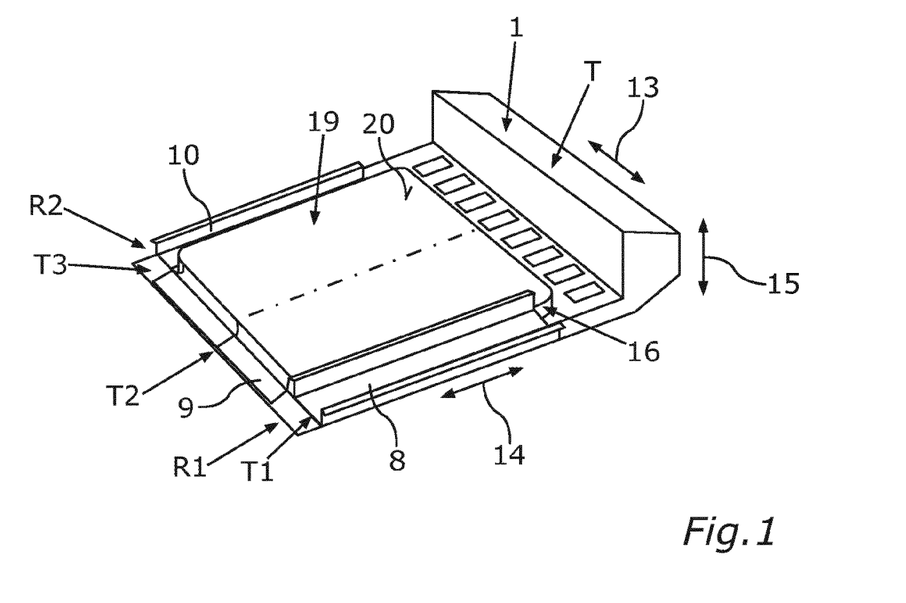
FIG. 1 is a schematic perspective view of a housing part for a storage device according to an embodiment of the invention for storing electrical energy for a motor vehicle.
Figure 7:
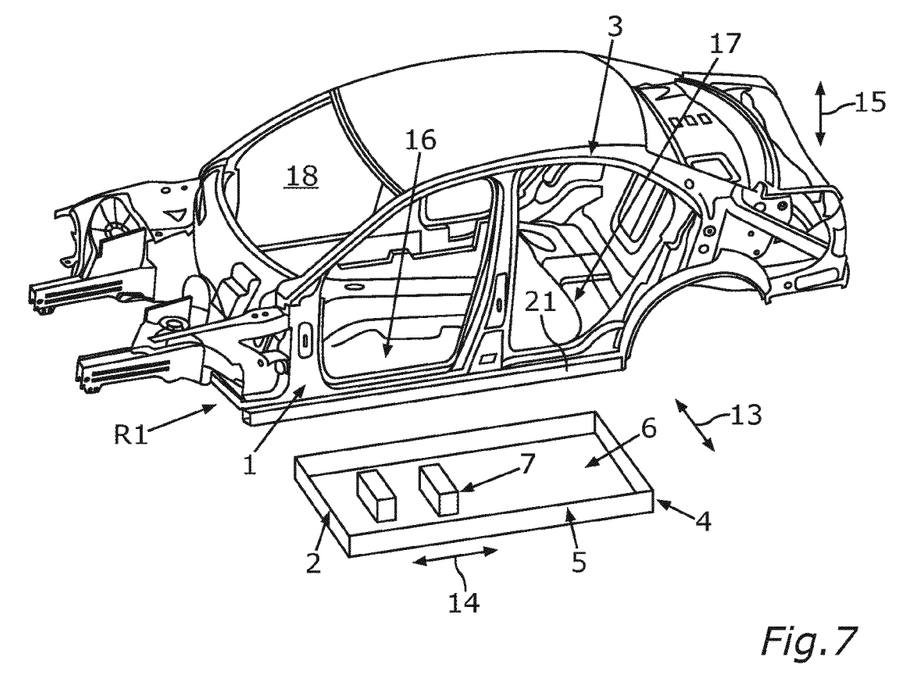
FIG. 7 is a schematic and perspective exploded view of the storage device.

FIG. 1 shows, in a schematic and perspective top view, a first housing part 1 for a storage device 2, which can be seen from FIG. 7 where it is shown in a schematic exploded view, for storing electrical energy for a motor vehicle. This means that the motor vehicle, which is preferably in the form of a motor car, in particular a passenger motor car, in its fully manufactured state has the storage device 2 and therefore the housing part 1. In addition, in its fully manufactured state, the motor vehicle comprises a self-supporting body 3 which can be seen from FIG. 7 and is also referred to as a body shell.

The storage device 2 has a storage housing 4 which comprises the housing part 1 and at least or precisely one second housing part 5. The housing parts 1 and 5 are, for example, formed separately from one another and are connected to one another. The storage housing 4 comprises or delimits a receiving space 6 in which a plurality of storage cells 7, illustrated particularly schematically in FIG. 7, for storing the electrical energy are accommodated. The receiving space 6 is delimited partially by the housing part 1 and partially by the housing part 5, and therefore the housing parts 1 and 5 in the state connected to each other and therefore in the assembled state delimit the receiving space 6 as a whole or completely.

The motor vehicle is in the form of a hybrid or electric vehicle, in particular a battery electric vehicle, and, in its fully manufactured state, comprises at least one electric machine by means of which the motor vehicle can be driven, in particular purely, electrically. For the, in particular purely, electrical driving of the motor vehicle by means of the electric machine, the electric machine is operated in a motor mode and therefore as an electric motor. For this purpose, the electric machine is supplied with electrical energy or electrical current, the electrical energy or electrical current being stored in the storage device 2, in particular in the storage cells 7. Furthermore, it is contemplated to operate the electric machine in a generator mode and therefore as a generator. In the generator mode, the electric machine is driven by the moving motor vehicle and therefore by kinetic energy of the motor vehicle. The kinetic energy of the motor vehicle is converted by means of the generator into electrical energy which is provided by the generator. The electrical energy provided by the generator can be fed into the storage cells 7 and therefore stored in the storage cells 7 or in the storage housing 4.

In order now to be able to realize particularly advantageous, in particular mechanical, properties of the housing part 1 and therefore of the storage housing 4 as a whole, the housing part 1 is in each case provided in respective partial regions T1, T2 and T3, which are preferably spaced apart from one another, with at least or precisely one reinforcing element 8, 9 and 10 formed separately from the housing part 1, such that the housing part 1 is reinforced in the partial regions T1, T2 and T3 by means of the respective reinforcing elements 8, 9 and 10.

Figure 2:
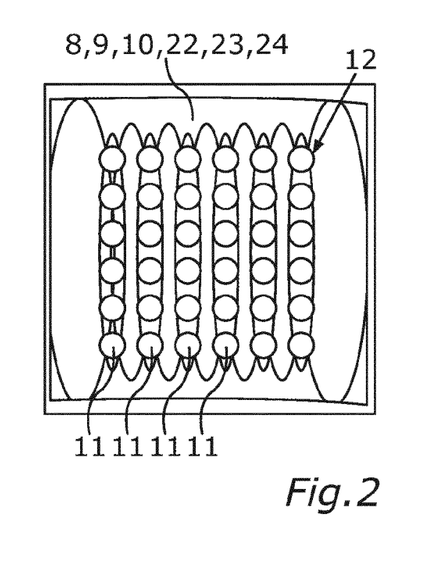
FIG. 2 is a schematic top view of a first embodiment of a reinforcing element for the, in particular local, reinforcing of the housing part.

As can be seen in particular in an overall view with FIG. 2 which shows a respective first embodiment of the respective reinforcing element 8, 9 and 10, the respective reinforcing element 8, 9 and 10 intrinsically has, that is to say as viewed by itself, a plurality of through openings 11 which are separated from one another and are spaced apart from one another. The through openings 11 form a pattern of perforations 12 which, in the first embodiment, is configured in the manner of a matrix and therefore in rows and columns. In other words, in the first embodiment, the through openings 11 are arranged in rows and columns, wherein the respective rows have the same number of through openings 11. The respective columns also have the same number of through openings 11.

It can be seen from FIG. 1 that the respective reinforcing element 8, 9 and 10 overlaps the respective associated partial region T1, T2 and T3. In addition, it is provided that the respective reinforcing element 8, 9 and 10 is adhesively bonded to the respective associated partial region T1, T2 and T3. In this case, for example, the respective reinforcing element 8, 9 and 10 is adhesively bonded by means of an adhesive, in particular at least substantially flatly, to the respectively associated partial region T1, T2 and T3. The adhesive therefore forms an adhesive layer which is arranged between the respective reinforcing element 8, 9 and 10 and the respectively associated partial region T1, T2 and T3. The adhesive and therefore the adhesive layer are preferably formed from a polymer. By this means, a particularly advantageous connection of the reinforcing elements 8, 9 and 10 to the partial regions T1, T2 and T3, respectively, can be realized. In particular, in addition to the adhesive bonding, it is contemplated that the reinforcing elements 8, 9 and 10 are welded to the housing part 1, in particular to the respective partial regions T1, T2 and T3, in particular by spot welding.

It has been shown to be furthermore particularly advantageous if the reinforcing elements 8, 9 and 10 are formed without the housing part 1 from a metallic material, in particular from a steel.

FIGS. 1 and 7 show the housing part 1 and the storage device 2, respectively, in their installed position. The storage device 2 and therefore the housing part 1 take on the installed position in the fully manufactured state of the motor vehicle. The reinforcing elements 8 and 10 are arranged here, with reference to the installed position of the storage device 2, in respective outer lateral edge regions R1 and R2 of the housing part 1, in particular of the body 3, in the transverse direction of the vehicle. FIG. 1 shows the transverse direction of the vehicle by a double arrow 13, and the longitudinal direction of the vehicle is shown in FIG. 1 by a double arrow 14. In addition, the vertical direction of the vehicle is shown by a double arrow 15.

It can be seen particularly well in an overall view with FIG. 7 that the housing part 1 is a floor element 16, which is also referred to as a floor panel or is configured as a floor panel, of a floor 17, which is also referred to as the main floor, of the self-supporting body 3. This means that the housing part 1 is part of the body 3 and is therefore a body component. In other words, the housing part 1 is part of the previously mentioned body shell. The floor element 16 here at least partially, in particular at least predominantly or completely, delimits the interior 18 of the motor vehicle downward in the vertical direction of the vehicle. A foot well 19 which is formed by the floor element 16 and, with reference to the installed position, faces upward in the vertical direction of the vehicle can be seen from FIG. 1, the foot well, for example in the fully manufactured state of the motor vehicle, being covered, and therefore being lined, with a lining element, in particular with a carpet. In addition, an upper side 20 of the floor element 16, the upper side facing upward in the vertical direction of the vehicle with respect to the installed position, can be seen from FIG. 1, the upper side 20 facing the interior 18 and in particular the lining element. The floor element 16 extends, for example, rearward in the longitudinal direction of the vehicle to under an, in particular rear, seat bench of the motor vehicle such that, for example, a part T of the floor element 16 is arranged below the seat bench in the vertical direction of the vehicle.

The housing part 1 intrinsically can be formed as a single piece. Furthermore, it is contemplated that the housing part 1 intrinsically has at least or precisely two structural elements which are formed separately from one another and are connected to one another and which therefore form the housing part 1 and therefore the floor element 16 as a whole.

The body 3 has two side sills which are spaced apart from each other in the transverse direction of the vehicle and extend at least in the longitudinal direction of the vehicle and of which the side sill which is on the left with reference to the forward direction of travel and is denoted by 21 in FIG. 7 can be seen in FIG. 7. The right side sill with reference to the forward direction of travel cannot be seen in FIG. 7. The partial region T1 which is provided with the reinforcing element 8 and is thereby reinforced by means of the reinforcing element 8 forms a first part, in particular a first shell, of the side sill 21. The partial region T3 forms a first part, in particular a first shell, of the right side sill. A respective second part, in particular a respective second shell, of the respective side sill is formed, for example, by a respective further component of the body 3. In the fully manufactured state of the body 3 or of the motor vehicle, the respective parts of the respective side sill are assembled and connected to one another such that the respective parts of the respective side sill form the respective side sill as a whole or completely. The side sills of the body 3 are therefore reinforced by means of the reinforcing elements 8 and 10. A particularly advantageous accident behavior of the housing part 1 can thereby be realized, in particular in respect of a side impact. As a result, the storage cells 7 can be particularly advantageously protected, even in the event of a side impact.

Figure 3:
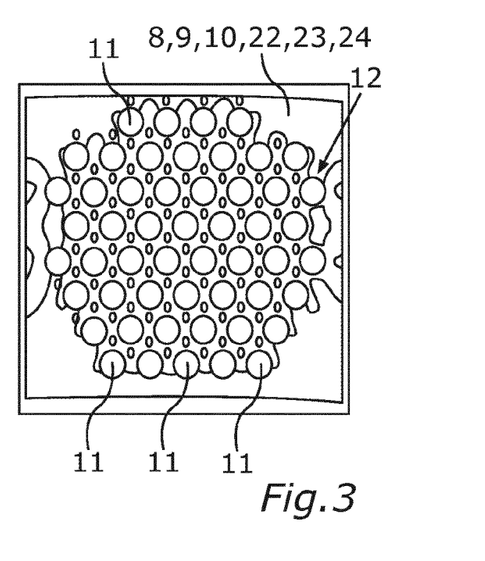
FIG. 3 is a schematic top view of the reinforcing element according to a second embodiment.
Figure 4:
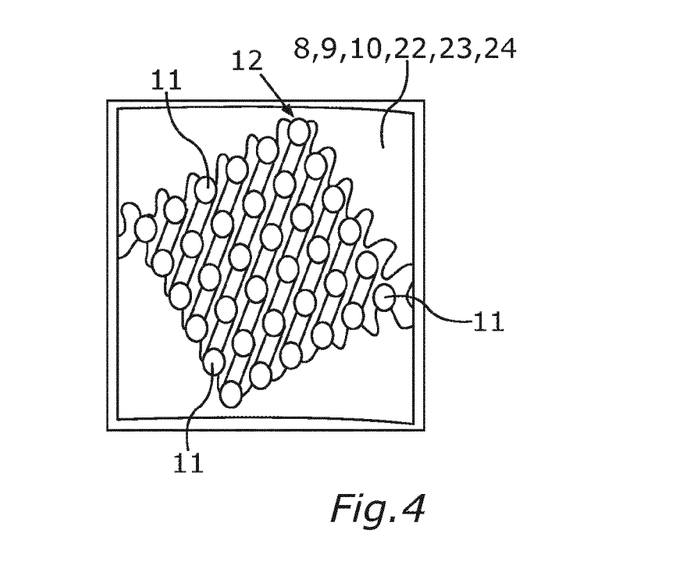
FIG. 4 is a schematic top view of the reinforcing element according to a third embodiment.

FIGS. 3 and 4 show a second and third embodiment, respectively, of the respective reinforcing element 8, 9 and 10. It can be seen from FIGS. 2 to 4 that the embodiments of the reinforcing elements 8, 9 and 10 differ from one another in respect of the pattern of perforations 12 intrinsically and/or in respect of an arrangement or a course of the pattern of perforations 12 with reference to the transverse direction of the vehicle and/or with reference to the longitudinal direction of the vehicle.

Figure 5:
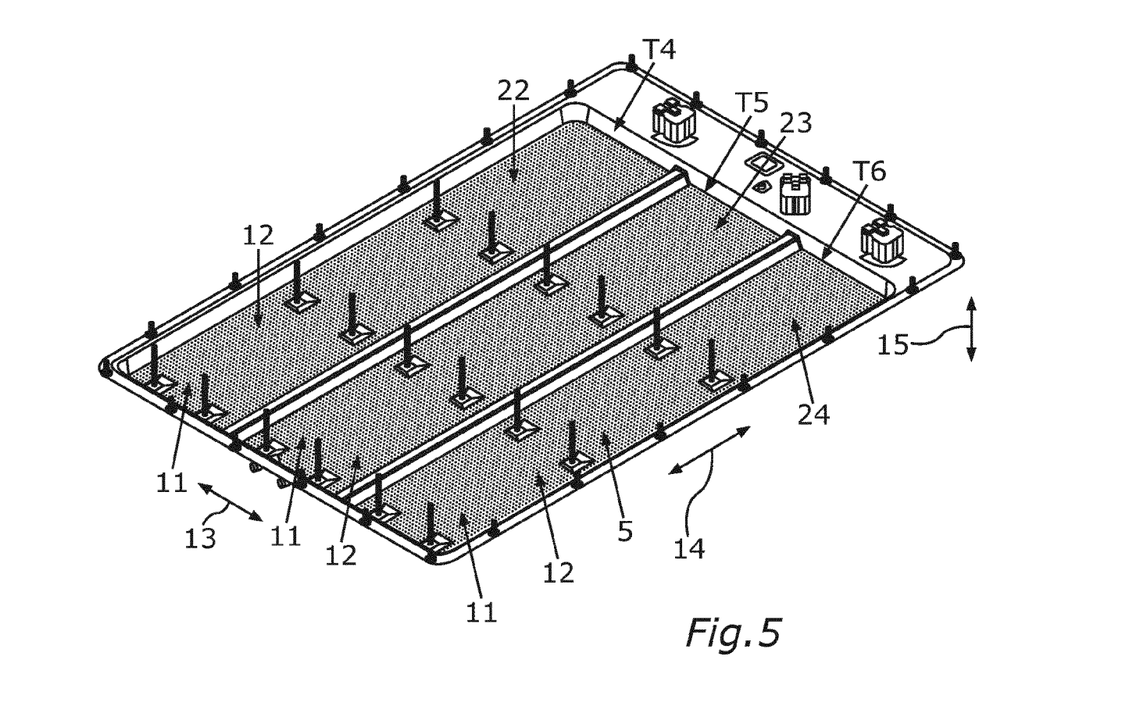
FIG. 5 is a schematic and perspective top view of a further housing part of the storage device.
Figure 6:
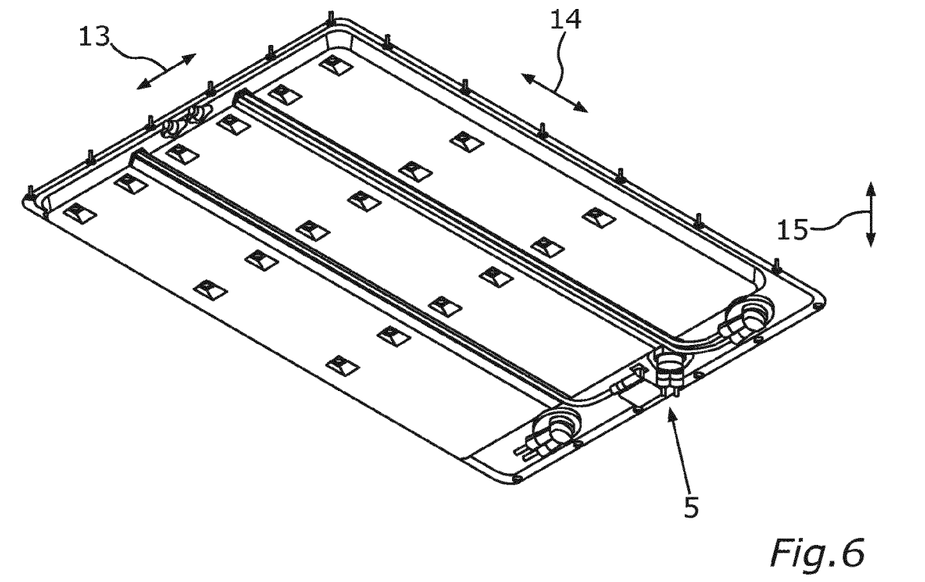
FIG. 6 is a schematic and perspective bottom view of the further housing part according to FIG. 4.

While FIG. 5 shows the housing part 5 in a schematic and perspective top view, FIG. 6 shows the housing part 5 in a schematic and perspective bottom view. In an overall view with FIG. 7, it can be seen that the housing part 5, which is formed separately from the housing part 1, is arranged below the housing part 1 in the fully manufactured state of the motor vehicle and in the vertical direction of the vehicle. In contrast to the housing part 1, the housing part 5 is not part of the body 3, but rather an add-on part which is attached to the body 3. The housing part 5 is also referred to as a floor panel or forms a floor panel since it at least partially, in particular at least predominantly or completely, covers the actual floor 17 or the floor element 16 downward in the vertical direction of the vehicle. Since, in contrast to the housing part 5, the housing part 1 is integrated in the body 3, after production of the body 3, for example, the housing part 5 is arranged on the housing part 1 from the bottom upward in the vertical direction of the vehicle, as a result of which the receiving space 6 is formed and closed. In particular, the housing part 5 is sealed gas- and/or liquid-tightly against the housing part 1. The housing part 5 therefore forms so to say a cover, which is also referred to as a housing cover, of the storage housing 4.

The housing part 5 is also provided, in respective partial regions T4, T5 and T6, which are preferably spaced apart from one another, with in each case at least or precisely one reinforcing element 22, 23 and 24, such that the housing part 5 is reinforced in the partial regions T4, T5 and T6 by means of the reinforcing elements 22, 23 and 24, respectively. The previous and following statements made with regard to the respective reinforcing elements 8, 9 and 10 can readily also be transferred to the respective reinforcing element 22, 23, 24, and vice versa. The respective reinforcing element 22, 23, 24 therefore intrinsically also has a plurality of through openings 11 which are separated from one another and are spaced apart from one another and which form a pattern of perforations 12. The respective reinforcing elements 8, 9, 10, 22, 23 and 24 are formed separately from one another and separately from the housing parts 1 and 5. For example, the reinforcing elements 22, 23 and 24 are adhesively bonded and/or welded to the housing part 5, in particular to the partial regions T4, T5 and T6.

While, for example, the reinforcing elements 8, 9 and 10 are arranged on an outer side of the housing part 1 facing away from the receiving space 6, and therefore outside the receiving space 6, the reinforcing elements 22, 23 and 24, for example, are arranged on an inner side of the housing part 5 facing the receiving space 6, and therefore in the receiving space 6.

A method for producing the storage housing 4 is described below. Within the context of the method, the respective housing part 1 or 5 is produced in such a manner or formed in such a manner that the respective housing part 1 or 5 in each case partially delimits the receiving space 6. For example, the respective housing part 1 or 5 is formed in such a manner or deep drawn in particular in such a manner that it is configured to be at least substantially shell-shaped at least in one region. For example, the shell-shaped region partially delimits the receiving space 6.

The respective housing part 1 or 5 is produced, for example, from a basic plate which is formed, in particular deep drawn. The basic plate can be configured as a single piece or else can have at least or precisely two structural elements which are formed separately from one another and are connected, in particular welded, to one another. The basic plate is formed, in particular deep drawn, by means of a forming tool. For this purpose, the basic plate is placed into the forming tool.

The respective reinforcing element 8, 9, 10, 22, 23 and 24 is produced, for example, from a reinforcing plate which is also referred to as a perforated plate or perforated patch and which is preferably likewise formed, in particular deep drawn. It is preferably provided here that the respective basic plate is provided with, in particular connected or preferably adhesively bonded to, the respective reinforcing plates forming the reinforcing elements 8, 9 and 10, and 22, 23 and 24. As a result, for example, the basic plate and the respective reinforcing plates form an assembly which—after the basic plate has been connected to the reinforcing plate—is introduced, in particular placed, into the forming tool. The basic plate and the reinforcing plates connected previously to the basic plate are then formed, in particular deep drawn, jointly, that is to say simultaneously, by means of the forming tool. The respective housing part 1 or 5 can thereby be reinforced effectively and efficiently. It is therefore preferably provided, within the context of the method, that the respective housing part 1 or 5 and the respective reinforcing elements 8, 9 and 10 and 22, 23 and 24 are connected to one another and are then or thereupon formed, in particular deep drawn, simultaneously or jointly by means of the forming tool. By this means, the partial regions T1-3 and T4-6 are particularly advantageously provided with the reinforcing elements 8, 9 and 10 and 22, 23 and 24, respectively, that is to say patched, such that the partial regions T1-3 and T4-6 are patched, and are thereby reinforced regions.

LIST OF REFERENCE SIGNS

1 Housing part
2 Storage device
3 Self-supporting body
4 Storage housing
5 Housing part
6 Receiving space
7 Storage cell
8 Reinforcing element
9 Reinforcing element
10 Reinforcing element
11 Through opening
12 Pattern of perforations
13 Double arrow
14 Double arrow
15 Double arrow 16 Floor element
17 Floor
18 Interior
19 Foot well
20 Upper side
21 Side sill
22 Reinforcing element
23 Reinforcing element
24 Reinforcing element
R1, R2 Edge region
T Part
T1-6 Partial region

The invention claimed is:

1. A storage device for storing electrical energy for a motor vehicle, comprising:
    a storage housing which has a receiving space, in which a plurality of storage cells for storing the electrical energy are accommodated;
    at least one housing part at least partially delimiting the receiving space;
    at least one reinforcing element by which the at least one housing part is reinforced in at least one partial region, wherein
    the at least one reinforcing element is formed separately from the at least one housing part and intrinsically has a plurality of through openings which are separated from one another and are spaced apart from one another, and
    the at least one housing part is a floor element of a floor of a self-supporting body for the motor vehicle.

2. The storage device according to claim 1, wherein the at least one reinforcing element overlaps the at least one partial region.

3. The storage device according to claim 1, wherein the at least one reinforcing element is adhesively bonded to the at least one partial region.

4. The storage device according to claim 1, wherein the at least one reinforcing element is welded to the at least one housing part.

5. The storage device according to claim 1, wherein the at least one reinforcing element and/or the at least one housing part is/are a metallic material element and/or part.

6. The storage device according to claim 1, wherein in an installed position of the storage device, the at least one reinforcing element is arranged in an outer lateral edge region of the at least one housing part in a transverse direction of the motor vehicle.

7. The storage device according to claim 6, wherein the at least one housing part is a floor element of a floor of a self-supporting body for the motor vehicle in the installed position of the storage device, the at least one reinforcing element forms at least part of a side sill of the self-supporting body.

8. The storage device according to claim 1, wherein the at least one reinforcing element comprises a plurality of reinforcing elements, and
    each of the plurality of reinforcing elements are separated by a further partial region free from any reinforcing element.

9. A motor vehicle comprising at least one storage device according to claim 1.

10. A method for producing a storage housing, which has at least one receiving space for a storage device with a plurality of storage cells and is intended for storing electrical energy for a motor vehicle, comprising:
    producing at least one housing part of the storage housing such that the at least one housing part at least partially delimits the receiving space, in which the plurality of storage cells that store the electrical energy can be accommodated; and
    reinforcing the at least one housing part in at least one partial region with at least one reinforcing element which is formed separately from the at least one housing part and which intrinsically has a plurality of through openings separated from one another and spaced apart from one another, wherein
    the at least one housing part is a floor element of a floor of a self-supporting body for the motor vehicle.

11. The method according to claim 10, wherein the at least one reinforcing element and the at least one housing part are connected to one another and are then simultaneously formed via a forming tool.

12. The method according to claim 11, wherein the forming is deep drawn.

13. The method according to claim 10, wherein the at least one reinforcing element comprises a plurality of reinforcing elements, and
    each of the plurality of reinforcing elements are separated by a further partial region free from any reinforcing element.

* * * * *